Figure 1:
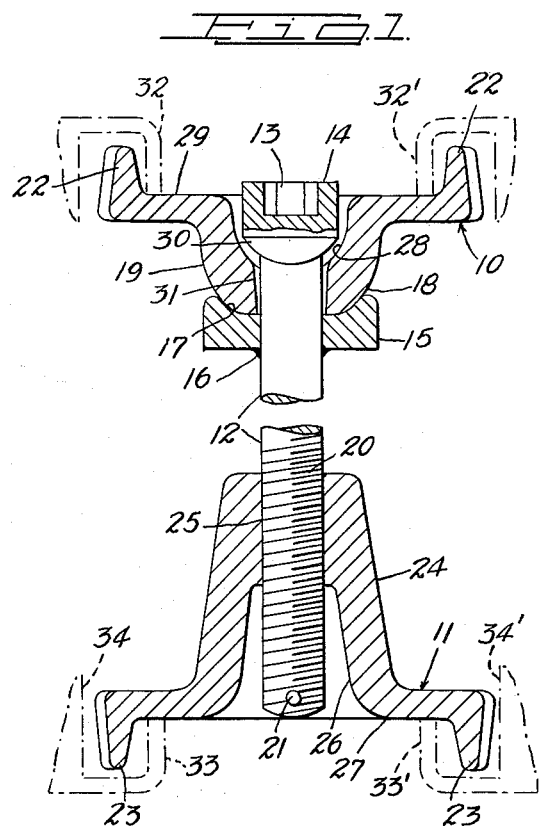

Aug. 29, 1961     J. G. IMPARATO     2,997,762

CLAMP UNITS

Original Filed July 25, 1958

INVENTOR.
JACK G. IMPARATO
BY
Howard C. Thompson
ATTORNEY 2,997,762
Patented Aug. 29, 1961

2,997,762
CLAMP UNITS
Jack G. Imparato, 1121 82nd St., Brooklyn, N.Y.
Original application July 25, 1958, Ser. No. 751,071, now Patent No. 2,930,091, dated Mar. 29, 1960. Divided and this application Jan. 25, 1960, Ser. No. 4,401
4 Claims. (Cl. 24—73)

This invention relates to a clamp unit comprising two plates with a single operating element for adjustably coupling the plates in establishing engagement with a pair of articles to be coupled by the unit. More particularly, the invention deals with a clamp unit of the character described, wherein the plates are what might be said to be deep-drawn to form a long threaded bearing portion in one plate and a socket in the other plate for reception of the head of the bolt or other coupling element employed.

Figure 2:
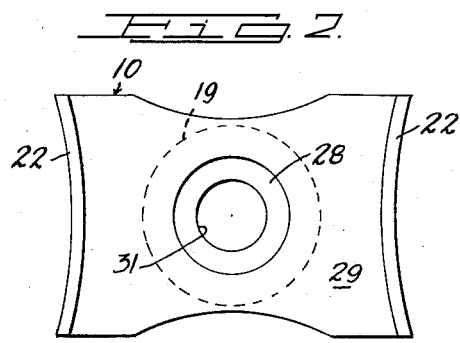

The novel features of the invention will be best understood from the following description, when taken together with the accompanying drawing, in which the separate parts are designated by suitable reference characters in each of the views and, in which:

FIG. 1 is a broken sectional view through a clamp unit made according to my invention, part of the construction being shown in elevation and indicating, in dot-dash lines, portions of two supports to be coupled by the clamp unit; and FIG. 2 is a diagrammatic plan view of the upper plate shown in FIG. 1 detached from the remainder of the clamp.

This application is a division of my prior application Serial Number 751,071, filed July 25, 1958, now Patent Number 2,930,091, dated March 29, 1960, and the divisional structure of the original application only is disclosed in the present application.

Considering FIGS. 1 and 2 of the drawing, my improved clamp unit comprises what may be termed a top plate 10 and bottom plate 11, these plates being adjustably coupled by an Allen-type bolt 12, having the socket 13 in the head 14 thereof. After mounting the plate 10 on the bolt and positioning the same adjacent the head 14, a recessed collar 15 is welded to the bolt, as at 16, the recess 17 of the collar generally conforming to the contour of the outer lower surface 18 of a deep-drawn bearing or socket portion 19 centrally of the plate 10.

The lower end portion of the bolt or element 12 is threaded, as seen at 20, and the end portion of the element 12 has an aperture for reception of a cotterpin or the like 21 to retain the clamp plate 11 against displacement from said end of the bolt 12.

Both plates 10 and 11 are generally of the same peripheral contour and, in FIG. 2 of the drawing, the plate 10 is diagrammatically shown to illustrate the curvature of the side flanges 22 of the plate 10, it being understood that the flanges 23 of the plate 11 are of the same general contour.

The plate 11 also includes a deep-drawn cylindrical bearing portion 24, which includes a reasonably long threaded bore 25 for engagement with the threaded end 20 of the bolt 12. In other words, the threaded portion forms, of the body 24, a nut-like member movable along the bolt 12 in adjusting positions of the plates 10 and 11 one with respect to the other. The plate, beyond the threaded portion 25, includes a socket 26 opening through the surface 27 of the plate 11.

The deep-draw 19 of the plate 10 also forms a socket 28 opening through the surface 29 of the plate, the lower portion of the socket being rounded to form a seat for the lower rounded portion 30 of the head 14. A bore 31 is formed in the deep-drawn bearing portion 19 which is considerably larger in diameter than the diameter of the bolt 12, so as to provide rocking movement of the plate 10 in adjustment of the plate to fit slight variances in overall dimensions of a pair of articles or products engaged and coupled by the clamp unit.

It will be apparent that the flanges 22 of the plate 10 extend outwardly to project beyond the surface 29 of the plate and, thus, form on said surface of the plate a channel opening through ends of the plate. In like manner, the flanges 23 project outwardly beyond the surface 27 of the plate 11 and form a channel which opens through ends of the plate 11.

In FIG. 1 of the drawing, I have indicated diagrammatically in dot-dash lines what might be termed upper and lower inturned flanges 32, 32'; 33, 33' of two generally similar cylinder or other products 34, 34'. With the structure of FIG. 1 of the drawing, the plates 10 and 11 are moved away from each other in engaging the products and, in this operation, the collar 15 urges the plate 10 in engagement with the products; thus the rounded surface 30 of the bolt head 14 will move away from the rounded seat 28 of the plate 10, as diagrammatically illustrated in the drawing.

From the foregoing, it will be apparent that clamping engagement with pairs of generally similar products can be accomplished by the spreading of plates and sufficient length of thread is provided, as at 20, on the element 12, to permit engagement of the flanges 22 and 23 with the products 34, 34' and also sufficiently long to provide a reasonable relative adjustment of the plates in engaging products of different spacings between the ends thereof and, of course, caring for slight variances in products which are substantially of the same length. In other words, a single clamp may be used for engagement of products which vary in length to the extent of an inch or two, but different units would be provided to care for engagement of products which vary materially in overall length. In this connection, it will be apparent that the only difference would be in the length of the bolt or element 12 employed.

By reason of the arrangement of the clamp unit on the articles, it will be apparent that clamped articles can be stacked one upon the other. It will also be apparent that a more or less standard type of Allen wrench would be used in rotation of the bolt or element 12 in the operation of coupling and uncoupling clamp units with pairs of products or articles. By locating the head 14 at the upper ends of the products, this operation becomes accessible at all times, whether the products are arranged in an upright position or are lying down horizontally, in which latter case, the surface 29 would be at one side of the products.

Having fully described my invention, what I claim as new and desire to secure by Letters Patent is:

1. A clamp unit comprising a pair of clamp plates, a bolt-like element with a rounded head at one end, said element adjustably coupling said plates, at least one plate having flanges at sides only of the plate, said flanges being arranged at right angles to one surface of said one plate, a central cylindrical bearing socket, in which the rounded head of said element is arranged, said socket having a bore greater in diameter than the diameter of the element arranged therein, said bearing socket projecting from the opposed surface of said one plate, the first named surface of the one plate being flat and forming on the one plate within the flanges a channel opening through opposed ends of the one plate, and means on the bolt engaging the first named plate in moving said plate in the direction of said head.

2. A clamp unit comprising a pair of clamp plates, a bolt-like element with a rounded head at one end, said element adjustably coupling said plates, at least one plate having flanges at sides only of the plate, said flanges being arranged at right angles to one surface of said one plate, a central cylindrical bearing socket, in which the rounded head of said element is arranged, said socket having a bore greater in diameter than the diameter of the element arranged therein, said bearing socket projecting from the opposed surface of said one plate, the first named surface of the one plate being flat and forming on the one plate within the flanges a channel opening through opposed ends of the one plate, and said element having a recessed collar fixed thereto inwardly of and adjacent said head, in conjunction with which said bearing socket operates.

3. A clamp unit comprising a pair of clamp plates, a bolt-like element with a rounded head at one end, said element adjustably coupling said plates, at least one plate having flanges at sides only of the plate, said flanges being arranged at right angles to one surface of said one plate, a central cylindrical bearing socket, in which the rounded head of said element is arranged, said socket having a bore greater in diameter than the diameter of the element arranged therein, said bearing socket projecting from the opposed surface of said one plate, the first named surface of the one plate being flat and forming on the one plate within the flanges a channel opening through opposed ends of the one plate, said element having a recessed collar fixed thereto inwardly of and adjacent said head, in conjunction with which said bearing socket operates, and the recess of said collar having a surface conforming to the contour of the adjacent surface of the bearing socket to provide swinging movement of the bearing socket in said collar.

4. A clamp unit comprising a pair of clamp plates, a bolt-like element with a rounded head at one end, said element adjustably coupling said plates, at least one plate having flanges at sides only of the plate, said flanges being arranged at right angles to one surface of said one plate, a central cylindrical bearing socket, in which the rounded head of said element is arranged, said socket having a bore greater in diameter than the diameter of the element arranged therein, said bearing socket projecting from the opposed surface of said one plate, the first named surface of the one plate being flat and forming on the one plate within the flanges a channel opening through opposed ends of the one plate, and means on the bolt engaging the one plate in moving said one plate in the direction of said head, said head of the element having a socket opening through the outer surface thereof, the other end portion of said element being threaded, and means on said threaded end for retaining the other of said clamp plates against displacement from the threaded end of said element.

References Cited in the file of this patent

UNITED STATES PATENTS 761,413    Schroer _____ May 31, 1904